United States Patent
Onishi

(10) Patent No.: US 9,221,645 B2
(45) Date of Patent: Dec. 29, 2015

(54) IMAGE FORMING APPARATUS ACCOUNTING FOR USER BODY HEIGHT

(71) Applicant: CANON KABUSHIKI KAISHA, Tokyo (JP)

(72) Inventor: Tetsuya Onishi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/579,675

(22) Filed: Dec. 22, 2014

(65) Prior Publication Data

US 2015/0183608 A1 Jul. 2, 2015

(30) Foreign Application Priority Data

Dec. 26, 2013 (JP) ................................. 2013-269668

(51) Int. Cl.
*B65H 31/24* (2006.01)
*B65H 43/00* (2006.01)
*G06K 15/00* (2006.01)

(52) U.S. Cl.
CPC ............... *B65H 31/24* (2013.01); *B65H 43/00* (2013.01); *G06K 15/403* (2013.01); *B65H 2511/15* (2013.01); *B65H 2511/20* (2013.01); *B65H 2511/511* (2013.01); *B65H 2553/42* (2013.01); *B65H 2557/512* (2013.01); *B65H 2801/06* (2013.01)

(58) Field of Classification Search
CPC .... B65G 1/167; B65G 1/137; B65G 2209/04; B65G 57/112; B65G 57/11; B65G 57/22; B65G 61/00
USPC .................................................. 358/1.1–3.31
See application file for complete search history.

(56) References Cited

U.S. PATENT DOCUMENTS

2004/0252341 A1* 12/2004 Adachi et al. ................ 358/1.18
2008/0031641 A1* 2/2008 Kaseno et al. ......... B41J 11/006 399/9
2013/0259631 A1* 10/2013 Allen et al. ................ 414/794.6

FOREIGN PATENT DOCUMENTS

JP 2011121752 A 6/2011

* cited by examiner

*Primary Examiner* — Marcellus Augustin
(74) *Attorney, Agent, or Firm* — Canon USA, Inc. IP Division

(57) ABSTRACT

An image forming apparatus includes an image forming unit configured to form an image on a sheet, a plurality of stacking units configured to stack the sheet on which the image is formed by the image forming unit, a reception unit configured to receive an instruction from a user for causing the image forming unit to form the image, a determination unit configured to determine whether a body height of the user is equal to or greater than a predetermined value, a decision unit configured to decide a stacking unit for stacking the sheet on which the image is formed from among the plurality of stacking units based on a result of determination by the determination unit, and a control unit configured to perform control so as to discharge the sheet on which the image is formed to the stacking unit decided by the decision unit.

21 Claims, 10 Drawing Sheets

USER REACHES OPERATIONAL POSITION
DETERMINED THAT BODY HEIGHT IS LESS THAN 120 CM

USER REACHES OPERATIONAL POSITION
DETERMINED THAT BODY HEIGHT IS 120 CM OR MORE

FIG. 8

| TYPE OF JOB | GENERAL USER (120 CM OR MORE) | WHEELCHAIR USER (LESS THAN 120 CM) |
|---|---|---|
| PERSONAL PRINT JOB | PRIORITIZE DESIGNATION MADE BY PRINTER DRIVER INSTALLED IN PC * PRIORITIZE COMMON DESIGNATION IF TRAY IS AUTOMATICALLY DESIGNATED | PRIORITIZE DESIGNATION MADE BY PRINTER DRIVER INSTALLED IN PC * PRIORITIZE LOWER TRAY IF TRAY IS AUTOMATICALLY DESIGNATED |
| FACSIMILE MEMORY OUTPUT JOB | PRIORITIZE COMMON DESIGNATION | PRIORITIZE LOWER TRAY |
| COPY JOB | PRIORITIZE COMMON DESIGNATION | PRIORITIZE LOWER TRAY |

IMAGE FORMING APPARATUS ACCOUNTING FOR USER BODY HEIGHT

BACKGROUND OF THE INVENTION

1. Field of the Invention

The present invention relates to an image forming apparatus including a plurality of discharge units for discharging a printed sheet, a method for controlling the same, and a recording medium.

2. Description of the Related Art

Japanese Patent Application Laid-Open No. 2011-121752 discusses an image forming apparatus including a plurality of stacking units for stacking sheets printed by a printing unit. According to Japanese Patent Application Laid-Open No. 2011-121752, the stacking unit suitable for an operator's body height is decided from among the plurality of stacking units based on a previously registered operator's body height and sheets are discharged to the selected stacking unit.

According to Japanese Patent Application Laid-Open No. 2011-121752, sheets are discharged to the stacking unit suitable for the operator's body height by previously registering the operator's body height. In a case where a user who is comparable in body height to the registered operator's body height performs printing, the user's convenience is improved because sheets are discharged to the stacking unit suitable for the user's body height.

However, even in a case where a wheelchair user uses the image forming apparatus discussed in Japanese Patent Application Laid-Open No. 2011-121752, sheets are discharged to the stacking unit suitable for the registered operator's body height. In a case where an average body height (160 cm, for example) is registered as the operator's height, a printed paper is discharged to an upper stacking unit. However, the upper stacking unit to which the wheelchair user needs to stretch out his or her arm to receive the discharged sheet is inconvenient for the wheelchair user to use. In a case where a height of the wheelchair user (100 cm, for example) is registered as the operator's height, the printed sheet is discharged to a lower stacking unit. The lower stacking unit is convenient for the wheelchair user to use, but the lower stacking unit is inconvenient for the user with an average body height to use because the lower stacking unit is covered under the upper stacking unit.

Since an image forming apparatus installed in an office is used by many users, it is desirable that the image forming apparatus is usable for many users. The image forming apparatus discussed in Japanese Patent Application Laid-Open No. 2011-121752 is usable for the user whose body height is almost equal to the previously registered body height. However, the convenience thereof is lowered for the user whose body height is significantly different from the registered body height.

SUMMARY OF THE INVENTION

The present invention is directed to a technique for discharging sheets, by dynamically changing a stacking unit of an image forming apparatus to the one which is suitable for a body height of a user who uses the image forming apparatus, to the stacking unit suitable for the body height of the user.

According to an aspect of the present invention, An image forming apparatus comprising: an image forming unit configured to form an image on a sheet as a printed sheet, a plurality of stacking units on which to stack the printed sheet, a reception unit configured to receive an instruction from a user to cause the image forming unit to form the image on the sheet, a determination unit configured to determine whether a body height of the user is equal to or greater than a predetermined value, wherein the body height of the user is a height of the user as (i) measured by an electronic device in response to an operation on the image forming apparatus to start printing and (ii) received by the determination unit, a decision unit configured to decide, from among the plurality of stacking units and based on the determination by the determination unit, a stacking unit on which to stack the printed sheet, and a control unit configured to perform control to discharge the printed sheet to the stacking unit decided by the decision unit.

According to another aspect of the present invention, an image forming apparatus includes an image forming unit configured to form an image on a sheet, a stacking unit configured to stack the sheet on which the image is formed by the image forming unit, a reception unit configured to receive an instruction from a user for causing the image forming unit to form the image, a determination unit configured to determine whether a body height of the user is equal to or greater than a predetermined value, in a case where the reception unit receives the instruction from the user, and a moving unit configured to move the stacking unit stacking the sheet on which the image is formed according to the instruction received by the reception unit based on a result of determination by the determination unit.

Further features of the present invention will become apparent from the following description of exemplary embodiments with reference to the attached drawings.

BRIEF DESCRIPTION OF THE DRAWINGS

FIG. 8 is a table for deciding discharge trays used by a general user and a wheelchair user in the operation mode of the image forming apparatus.

DESCRIPTION OF THE EMBODIMENTS

Various exemplary embodiments, features, and aspects of the invention will be described in detail below with reference to the drawings.

Figure 1:
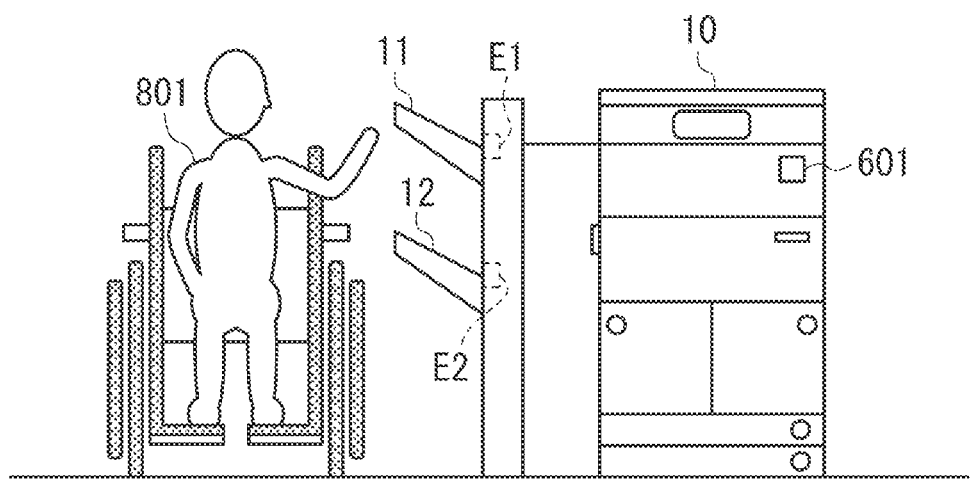
FIG. 1 is an external view illustrating an image forming apparatus according to a first exemplary embodiment of the present invention.

FIG. 1 is an external view of an image forming apparatus 10 according to a first exemplary embodiment of the present invention.

The image forming apparatus 10 includes discharge trays 11 and 12 on which a sheet printed by the image forming apparatus 10 is stacked. An infrared array sensor 601 is attached to a front surface of the image forming apparatus 10. The image forming apparatus 10 according to the first exemplary embodiment is designed so that sheets are discharged to the discharge tray 11 or 12 from which not only a general user and also a wheelchair user 801 can easily take sheets. A position of each of the discharge trays 11 and 12 is fixed. The image forming apparatus 10 according to the first exemplary embodiment includes a discharge port E1 for discharging image formed sheets to the discharge tray 11 and a discharge port E2 for discharging image formed sheets to the discharge tray 12. According to the first exemplary embodiment, the position of each of the discharge trays 11 and 12 is fixed. However, the position of each of the discharge trays 11 and 12 may be moved upward or downward by a movement mechanism (not illustrated). If the image forming apparatus 10 includes the movement mechanism for moving the discharge trays 11 and 12, a single discharge port may be provided.

Figure 2:
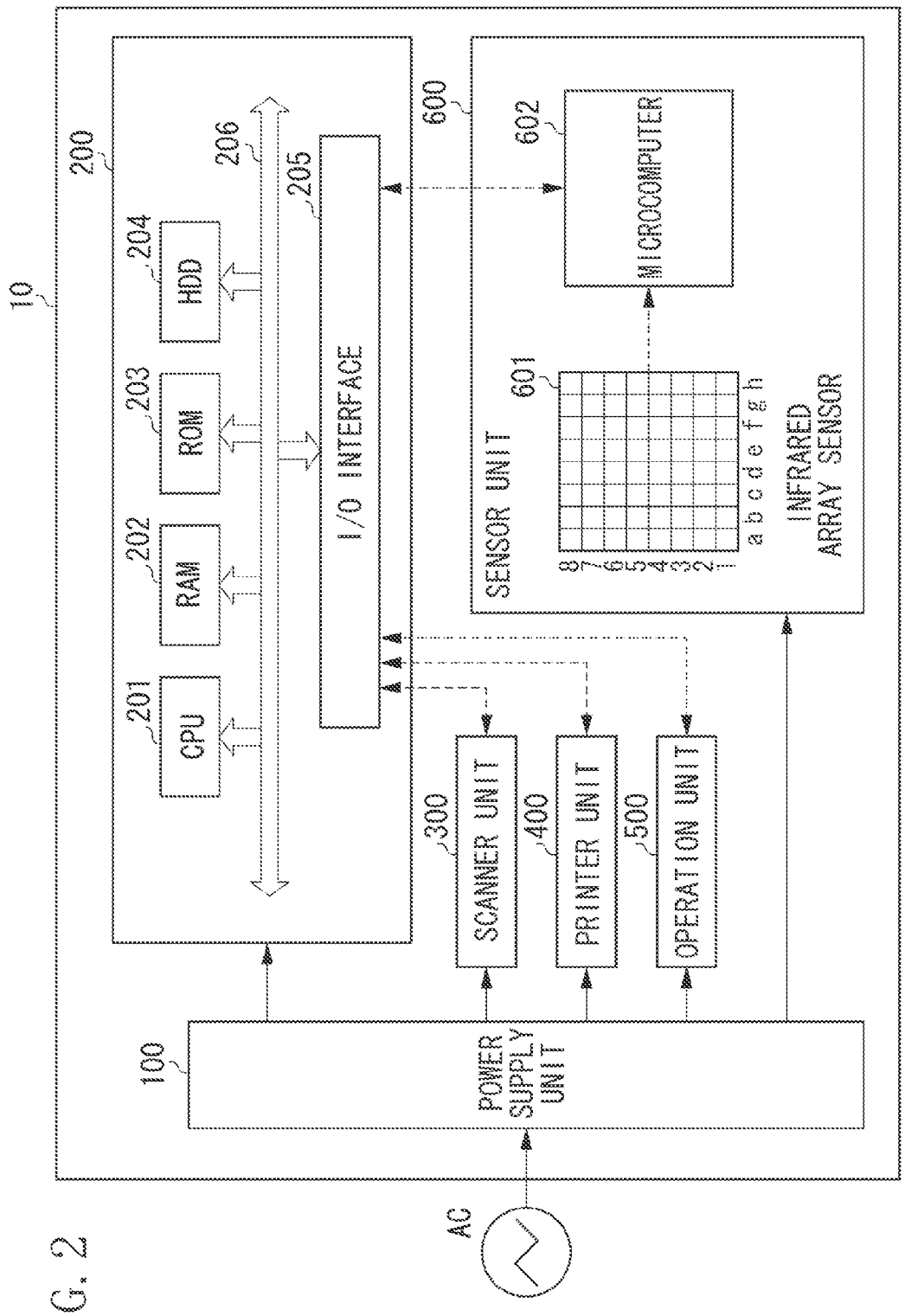
FIG. 2 is a hardware block diagram illustrating the image forming apparatus.
Figure 3:
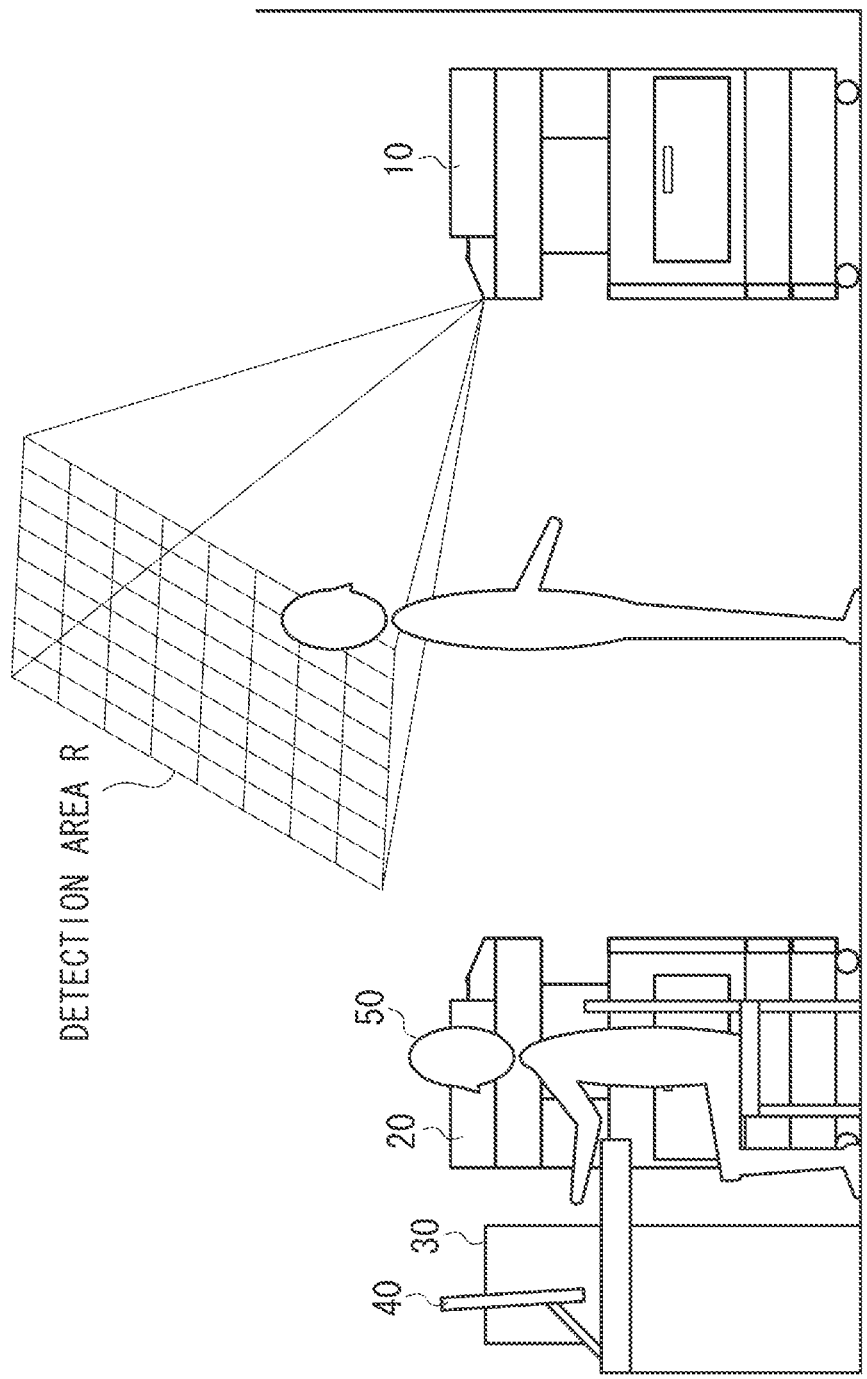
FIG. 3 illustrates a detection area R of an infrared array sensor.

FIG. 2 is a hardware block diagram of the image forming apparatus 10. FIG. 3 is a diagram illustrating a detection area R of the infrared array sensor 601.

The image forming apparatus 10 includes a power supply unit 100, a controller unit 200, a scanner unit 300, a printer unit 400, an operation unit 500, and a sensor unit 600.

The power supply unit 100 converts alternating current (AC) supplied from an AC power supply to direct current (DC). The converted DC is supplied to the controller unit 200, the scanner unit 300, the printer unit 400, the operation unit 500, and the sensor unit 600.

The controller unit 200 controls the operation of each unit (the scanner unit 300, the printer unit 400, the operation unit 500, and the sensor unit 600) of the image forming apparatus 10. The controller unit 200 includes a central processing unit (CPU) 201, a random access memory (RAM) 202, a read only memory (ROM) 203, a hard disk drive (HDD) 204, and input/output (I/O) interface 205.

The CPU 201 controls access to various devices connected to the CPU 201 based on a control program stored in the ROM 203. The RAM 202 is a system work memory for operating the CPU 201. The HDD 204 is capable of storing system software and image data. The I/O interface 205 is an interface unit for connecting a system bus 206 to external devices (the scanner unit 300, the printer unit 400, the operation unit 500, and the sensor unit 600).

According to the present exemplary embodiment, the controller unit 200 controls a discharge destination (the discharge trays 11 and 12) of sheets on which images are formed by the printer unit 400 described below.

The scanner unit (reading unit) 300 optically reads an image from a document to generate image data.

The printer unit (image forming unit) 400 electrophotographically forms an image on a recording medium (sheet).

The operation unit 500 includes a display unit for displaying various pieces of information and various buttons for receiving an operation from a user. The operation unit (reception unit) 500 receives a printing execution instruction (a copy job execution instruction, a print job execution instruction, and a facsimile memory output job execution instruction) from the user.

The sensor unit 600 is provided to detect a person accessing the image forming apparatus 10. The sensor unit 600 according to the present exemplary embodiment is provided to measure a body height of a person who accesses the image forming apparatus 10. The "body height" according to the present exemplary embodiment refers to the height of the person who accesses the image forming apparatus 10. More specifically, in a case where a wheelchair user accesses the image forming apparatus 10, the height of the user in a state sitting in the wheelchair is expressed as "body height". The sensor unit 600 includes the infrared array sensor 601 and a microcomputer 602.

The infrared array sensor 601 is a sensor in which thermopile elements (receiving unit) 1a to 8h for receiving infrared rays are formed in a grid format. The thermopile elements 1a to 8h receive infrared rays emitted from a person and output information indicating temperature to the microcomputer 602. The information indicating temperature is a voltage value, for example. The microcomputer 602 compares a reference voltage value with the voltage value output from the thermopile elements 1a to 8h to measure the temperature of an object, such as a person. The information indicating temperature output to the microcomputer 602 may be an analogue value or a digital value. The infrared array sensor 601 according to the present exemplary embodiment is provided to detect a person who accesses the image forming apparatus 10. For such a reason, as illustrated in FIG. 3, the infrared array sensor 601 is fixed and directed obliquely upward to face a person's face not covered with cloth, so as to accurately measure the temperature of the person. Fixing the infrared array sensor 601 directed obliquely upward prevents the heats of another image forming apparatus 20 installed in front of the image forming apparatus 10, a PC 30 and a monitor 40 on a desk, and a person 50 sitting on a chair from being detected.

The infrared array sensor 601 is not limited to be directed obliquely upward. The infrared array sensor 601 may be fixed and directed obliquely downward, so that infrared array sensor 601 faces the feet of a person.

The microcomputer 602 determines whether a person accesses the image forming apparatus 10 based on the information indicating temperature output from the thermopile elements 1a to 8h. In a case where the microcomputer 602 determines that a person accesses the image forming apparatus 10, the microcomputer 602 outputs information indicating that a person accesses the image forming apparatus 10 to the controller unit 200. The detail of algorithm for determining that a person accesses the image forming apparatus 10 is described below.

A power state of the image forming apparatus 10 is described below.

The power state of the image forming apparatus 10 includes a power off state, a sleep state, or a standby state. The power state of the image forming apparatus 10 is not limited only to the above described three states.

The power off state is a state where no power is supplied from the power supply unit 100 to the controller unit 200, the scanner unit 300, the printer unit 400, the operation unit 500, and the sensor unit 600. In the power off state, a printer function and a scanner function of the image forming apparatus 10 cannot be used.

The sleep state is a state where power is supplied from the power supply unit 100 to the controller unit 200, the operation unit 500, and the sensor unit 600, but no power is supplied from the power supply unit 100 to the scanner unit 300 and the printer unit 400. If the operation unit 500 is operated, a print job is received via a network, or a person enters a recovery start area of the infrared array sensor 601 in the sleep state, the image forming apparatus 10 recovers from the sleep state to the standby state. In the sleep state, power needs to be supplied to the infrared array sensor 601 of the sensor unit 600, but power supply to the microcomputer 602 may be stopped. However, if any of the thermopile elements 1a to 8h in the infrared array sensor 601 detects heat, power needs to be quickly supplied to the microcomputer 602.

The standby state is a state where power is supplied from the power supply unit 100 to the controller unit 200, the scanner unit 300, the printer unit 400, the operation unit 500, and the sensor unit 600. In the standby state, if the operation unit 500 is not operated for a predetermined time period and a job is not received from the network for a predetermined time period, the image forming apparatus 10 shifts to the sleep state.

<Sleep Recovery Algorithm>

FIGS. 4A to 4D are diagrams for describing algorithm for recovering the image forming apparatus 10 from the sleep state using the infrared array sensor 601.

With reference to FIGS. 4A to 4D, the following describes the algorithm for determining whether a person accesses the image forming apparatus 10.

In a case where predetermined thermopile elements (the thermopile elements 5a to 8h in rows 5 to 8, for example) detect a predetermined temperature (30° C., for example), the microcomputer 602 determines that a person accesses the image forming apparatus 10.

Figure 4A:
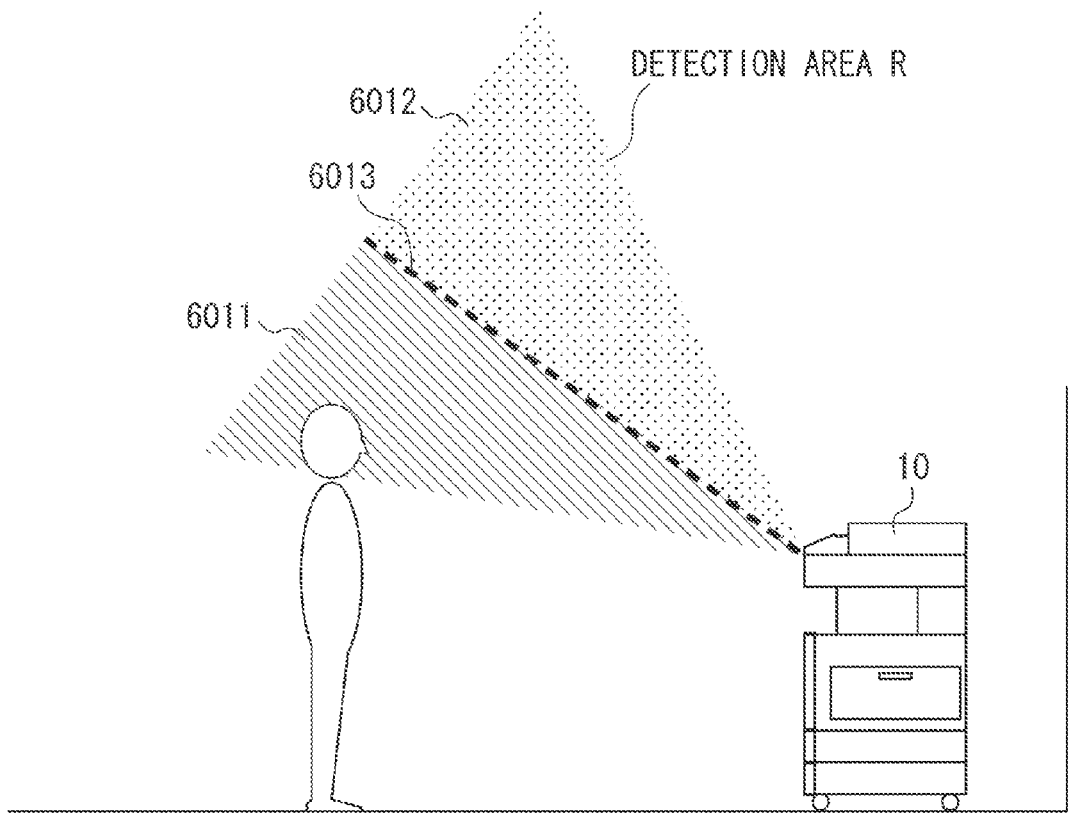
FIGS. 4A and 4B, and 4C and 4D are diagrams for describing algorithm for recovering the image forming apparatus from a sleep state using the infrared array sensor.
Figure 4B:
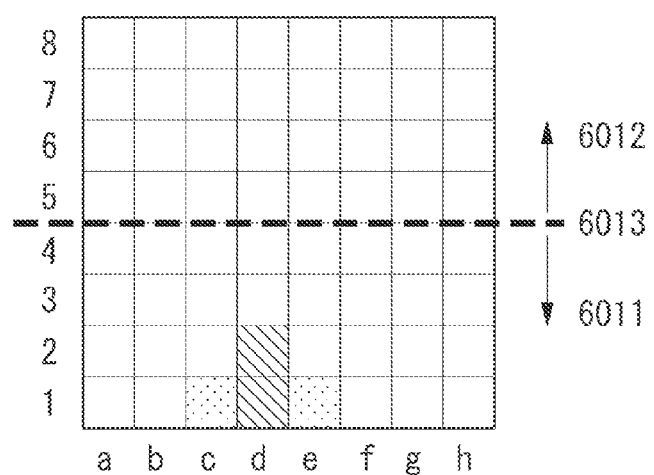

As illustrated in FIG. 4A, if a user enters a detection area R where the infrared array sensor 601 can detect the person from a position away from the image forming apparatus 10, the infrared array sensor 601 indicates a state illustrated in FIG. 4B. More specifically, the lower thermopile elements 1c, 1d, 1e, and 2d of the infrared array sensor 601 detect the heat of the user.

Figure 4C:
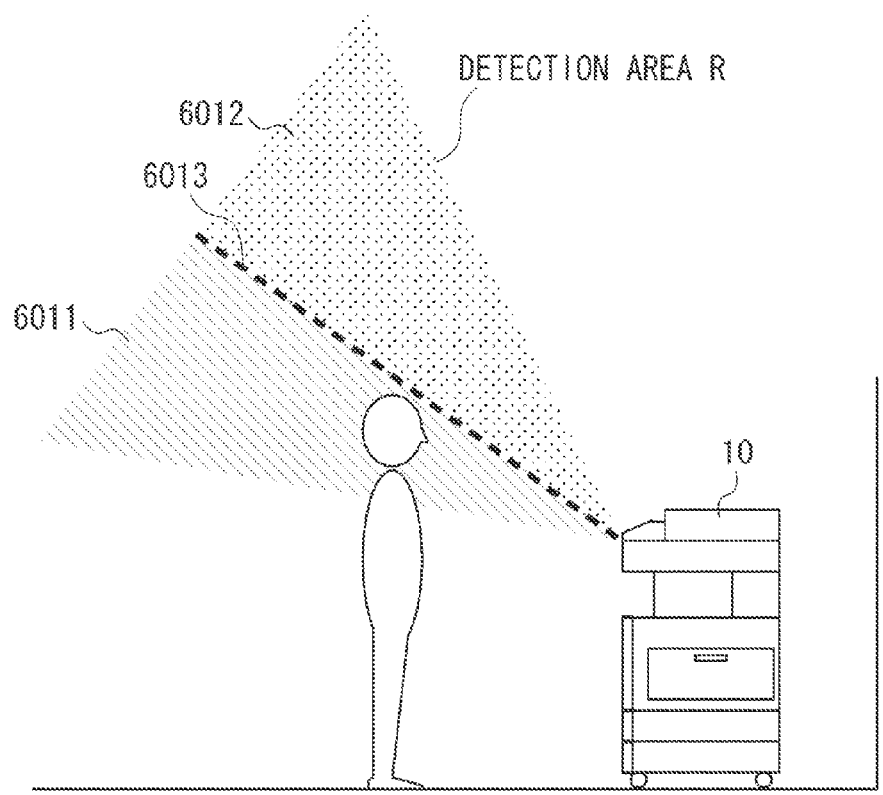
Figure 4D:
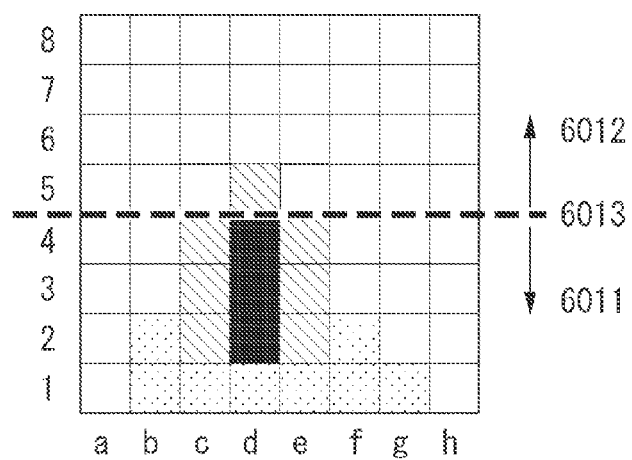

As illustrated in FIG. 4C, if the user further accesses the image forming apparatus 10, the infrared array sensor 601 indicates a state illustrated in FIG. 4D. More specifically, the thermopile elements in the first, second, third, fourth, and fifth rows of the infrared array sensor 601 detect the heat of the user, in order. If the user accesses the image forming apparatus 10, the elements in d, c, e, b, and g columns detect the heat of the user, in order.

Accordingly, as the user further accesses the image forming apparatus 10, the number of the thermopile elements detecting the heat of the user increases.

The microcomputer 602 determines whether the person enters a recovery area 6012 beyond a borderline 6013. If the microcomputer 602 determines that the person enters the recovery area 6012, the microcomputer 602 determines that the person accesses the image forming apparatus 10 and causes the image forming apparatus 10 to recover from the sleep state to the standby state. More specifically, if the thermopile elements 5a to 8h in the fifth, sixth, seventh, and eighth rows above the borderline 6013 detect the heat of the user, the microcomputer 602 determines that the person accesses the image forming apparatus 10. The microcomputer 602 outputs a recovery signal to the controller unit 200. The controller unit 200 causes the image forming apparatus 10 in the sleep state to recover to the standby state based on the recovery signal.

According to the present exemplary embodiment, the borderline 6013 is provided between the thermopile elements in the fourth and fifth rows, but the borderline 6013 is not limited to be provided between the thermopile elements in the fourth and fifth rows. The borderline 6013 may be a straight line or a substantially V-shaped line.

According to the present exemplary embodiment, the image forming apparatus 10 recovers from the sleep state if one of the thermopile elements 5a to 8h in the fifth, sixth, seventh, and eighth rows above the borderline 6013 detects the temperature exceeding the predetermined temperature. Alternatively, the image forming apparatus 10 may return from the sleep state if a plurality of the thermopile elements 5a to 8h detects the temperature exceeding the predetermined temperature.

The algorithm for determining that the person accesses the image forming apparatus 10 is not limited to the above-described method. For example, if the predetermined number or more of the thermopile elements 1a to 8h outputting information indicating the temperature exceeds the predetermined temperature (30° C., for example) for a predetermined time period, it may be determined that a person accesses the image forming apparatus 10. Alternatively, if any of the thermopile elements in the thermopile elements 1a to 8h (5a to 8h in the fifth, sixth, seventh, and eight rows, for example) outputs information indicating the temperature exceeding the predetermined temperature, it may be determined that a person accesses the image forming apparatus 10.

<Detection State in a Case where a Wheelchair User or a General User Accesses the Image Forming Apparatus>

Figure 5A:
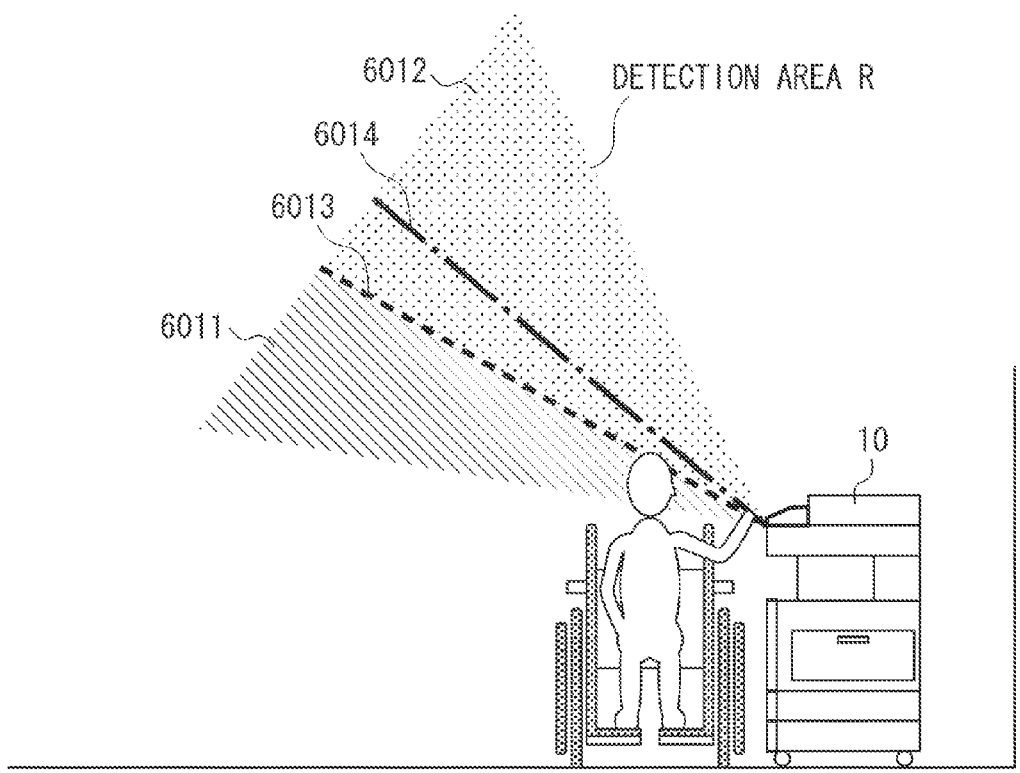
FIG. 5A is a diagram illustrating a positional relationship between a wheelchair user in the detection area R and the image forming apparatus.
Figure 5B:
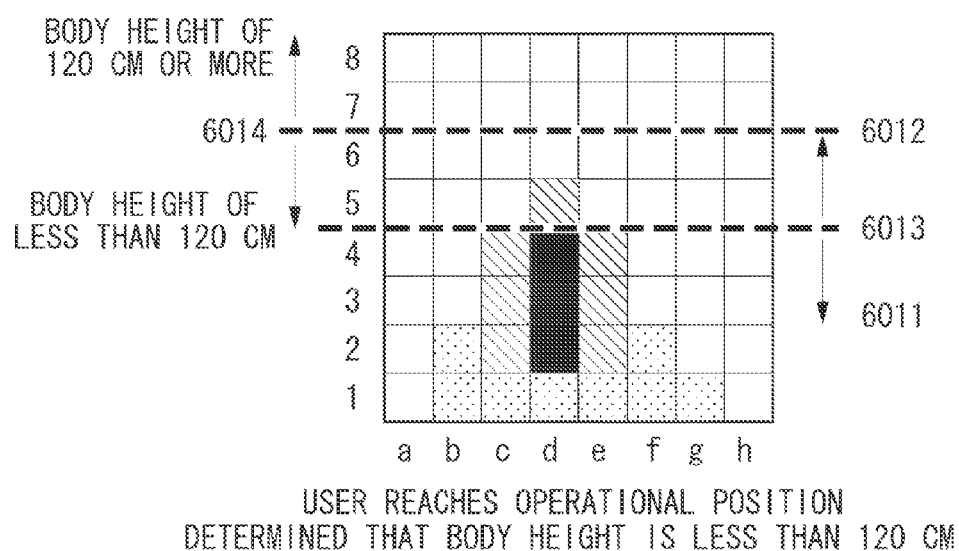
FIG. 5B is a diagram illustrating a detection state of the infrared array sensor.

FIG. 5A is a diagram illustrating a positional relationship between a wheelchair user entering the detection area R and the image forming apparatus 10, and FIG. 5B is a diagram illustrating a detection state of the infrared array sensor 601.

Figure 6A:
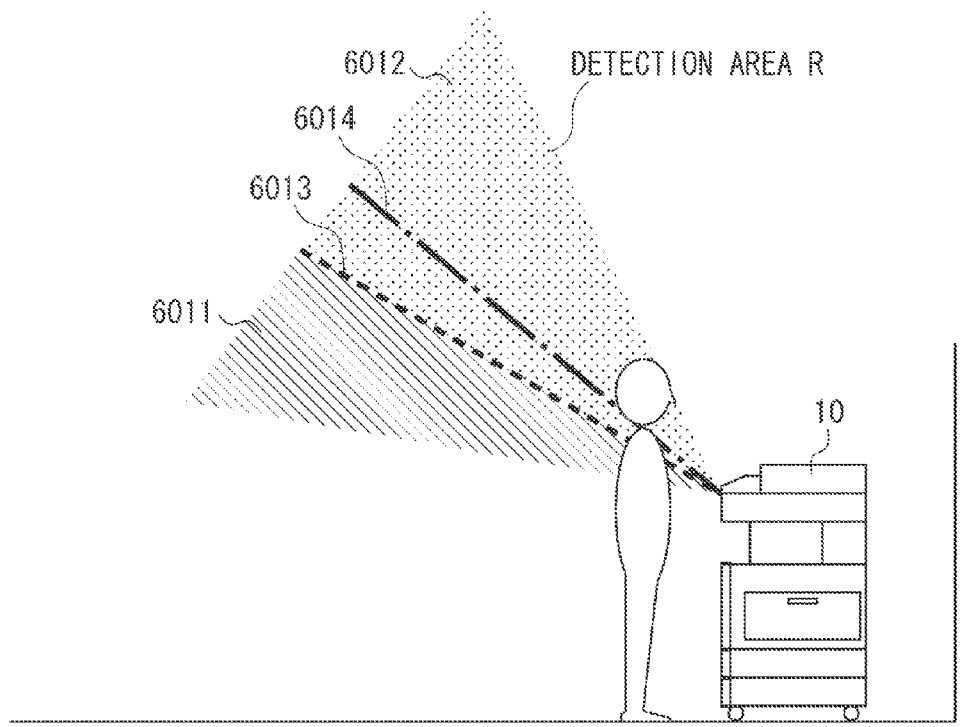
FIG. 6A is a diagram illustrating a positional relationship between a user in the detection area R and the image forming apparatus.
Figure 6B:
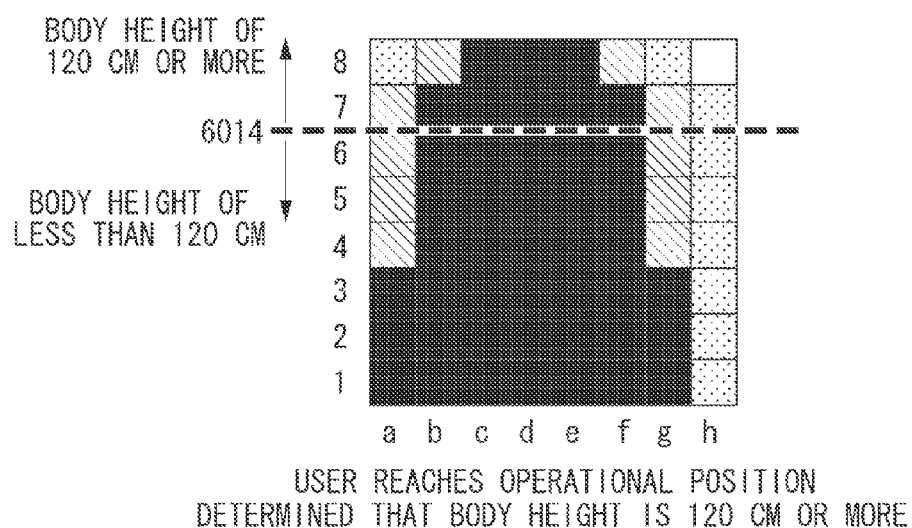
FIG. 6B is a diagram illustrating a detection state of the infrared array sensor.

FIG. 6A is a diagram illustrating a positional relationship between a user entering the detection area R and the image forming apparatus, and FIG. 6B is a diagram illustrating a detection state of the infrared array sensor 601.

As illustrated in FIGS. 5A and 5B, the infrared array sensor 601 is configured to cause the image forming apparatus 10 to recover from the sleep state, even if a wheelchair user (a user whose body height is 120 cm or less, for example) reaches a position (operational position) where the user can operate the operation unit 500. More specifically, the fixing position and the fixing angle of the infrared array sensor 601 are adjusted so that any of the thermopile elements 5a to 8h in the fifth to eighth rows detects a wheelchair user, when the wheelchair user reaches the operational position. With such an arrangement, the wheelchair user just approaches the image forming apparatus 10, and the image forming apparatus 10 automatically returns from the sleep state.

A borderline 6014 is a virtual line which is set to measure the body height of a user who uses the image forming apparatus 10.

If none of the elements 7a to 8h above the borderline 6014 does not detect the temperature exceeding the predetermined temperature (30° C., for example) when the user operates the operation unit 500, the microcomputer 602 determines that the body height of the user is less than a predetermined value (less than 120 cm, for example). In the example illustrated in FIGS. 5A and 5B, none of the thermopile elements 7a to 8h does not detect the temperature exceeding the predetermined temperature when the wheelchair user operates the operation unit 500, so that the microcomputer 602 determines that the body height of the user is less than the predetermined value.

On the other hand, if any one of or a plurality of the thermopile elements 7a to 8h above the borderline 6014 detects the temperature exceeding the predetermined temperature when the user operates the operation unit 500, the microcomputer 602 determines that the body height of the user exceeds the predetermined value. In the example illustrated in FIGS. 6A and 6B, some of the elements 7a to 8h detects the temperature exceeding the predetermined temperature when a general user operates the operation unit 500, so that it is determined that the body height of the user who operates the operation unit 500 exceeds the predetermined value.

<Method for Measuring Body Height>

Figure 7:
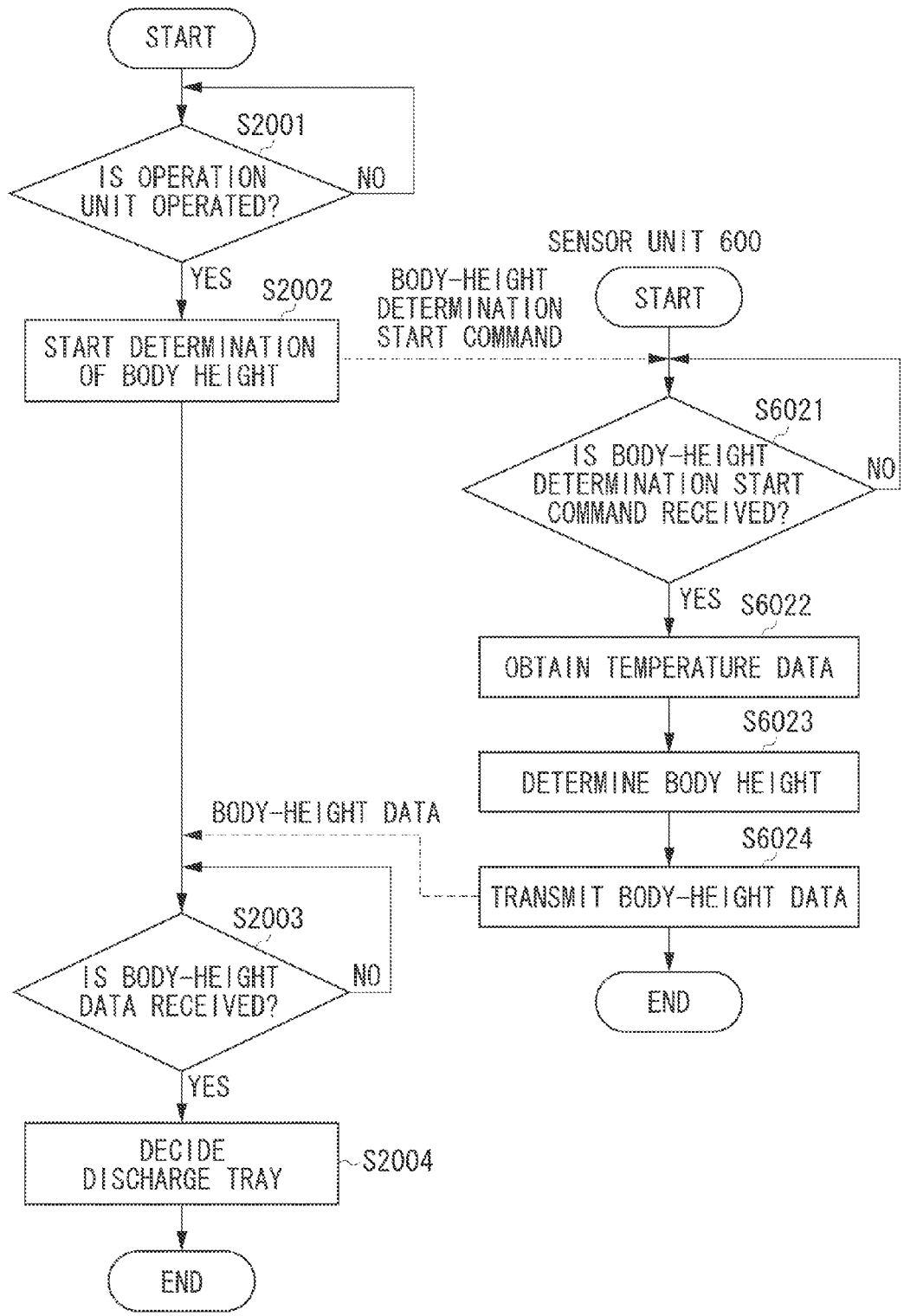
FIG. 7 is a flow chart illustrating a method for measuring a body height.

FIG. 7 is a flow chart illustrating a method for measuring body height.

According to the present exemplary embodiment, the CPU 201 of the controller unit 200 and the microcomputer 602 of the sensor unit 600 execute the control program based on the flow chart illustrated in FIG. 7.

In step S2001, the controller unit 200 determines whether an operation for starting printing is performed in the operation unit 500. In step S2001, determination of whether the operation unit 500 is operated is performed. Alternatively, with an image forming apparatus provided with a card reader, determination of whether the card reader reads information stored in a card may be performed.

If the operation unit 500 is operated (YES in step S2001), the processing proceeds to step S2002 and the controller unit 200 sends a body-height determination start command to the microcomputer 602 of the sensor unit 600 to measure the body height of the user who operates the operation unit 500.

If the microcomputer 602 receives the body-height determination start command (YES in step S6021), the processing proceeds to step S6022 and the microcomputer 602 obtains temperature data from the thermopile elements 1a to 8h of the infrared array sensor 601. Accordingly, the temperature data of the user who operates the operation unit 500 in step S2001 can be obtained. In step S6023, the microcomputer 602 measures the body height of the user who operates the operation unit 500 from the temperature data obtained in step S6022. More specifically, the microcomputer 602 determines whether the temperatures of the thermopile elements 7a to 8h in the seventh and eighth rows above the borderline 6014 among the obtained temperatures of the thermopile elements 1a to 8h are higher than the predetermined temperature. If there is a thermopile element which detects the temperature higher than the predetermined temperature, the microcomputer 602 determines that the body height of the user who operates the operation unit 500 is 120 cm or greater. On the other hand, if there is no thermopile element which detects the temperature higher than the predetermined temperature, the microcomputer 602 determines that the body height of the user who operates the operation unit 500 is less than 120 cm. The determination of whether the body height of the user is 120 cm or not is performed according to the present exemplary embodiment, but a body height taken as a threshold is not limited to 120 cm.

In step S6024, the microcomputer 602 transmits data indicating the body height of the user (or information indicating whether the body height is 120 cm or greater) who operates the operation unit 500 to the controller unit 200.

If the controller unit 200 receives the data indicating the body height from the microcomputer 602 (YES in step S2003), the processing proceeds to step S2004. In step S2004, the controller unit 200 decides a discharge tray as a sheet discharge destination for the sheet printed by the printer unit 400 among the discharge trays 11 and 12.

According to the present exemplary embodiment, the printed product output by executing a job which is for starting printing by an operation on the operation unit 500 (hereinafter referred to as an operation-unit job) is output to the discharge tray 11 or 12 which is decided in step S2004. The operation-unit job includes a personal print job, a copy job, and a facsimile memory output job. The personal print job is a job in which the user logging in the image forming apparatus 10 issues an instruction to start printing. The copy job is a job in which the printer unit 400 performs printing using image data corresponding to an image of a document read by the scanner unit 300. The facsimile memory output job is a job in which the facsimile data stored in the HDD 204 and the RAM 202 of the controller unit 200 is printed according to the operation of the user. On the other hand, a printed product output by execution of a job which is executed without an operation of the operation unit 500 is discharged to the predetermined discharge tray 11 or 12, and not based on the selection between the discharge trays 11 and 12 in step S2004.

According to the first exemplary embodiment, the microcomputer 602 determines the body height of the user. However, the controller unit 200 may determine the body height of the user in such a manner that the controller unit 200 receives temperature data from the microcomputer 602 or the infrared array sensor 601.

According to the first exemplary embodiment, the controller unit 200 controls the discharge of sheets to the discharge tray 11 or 12. However, the printer unit 400 may perform control for discharging sheets to the discharge tray 11 or 12. In a case where a finisher unit having a staple function or a bookbinding function is connected to the image forming apparatus 10, the control unit which controls the finisher unit may perform control for discharging sheets to the discharge tray 11 or 12.

[Relationship between Type of Job and Discharge Tray]

The image forming apparatus 10 according to the present exemplary embodiment has a function in which the discharge trays for outputting sheets are switched according to a job executed to prevent discharged printed products from being mixed up. For example, the image forming apparatus 10 can be set in such a manner that printed products output by execution of a copy job are output to the discharge tray 11 and printed products output by execution of a print job via the network are output to the discharge tray 12. Furthermore, the image forming apparatus 10 used in an office where a large number of facsimiles is received is set in such a manner that printed products by facsimile reception are output to the discharge tray 11 which is the upper discharge tray thereby user convenience is improved.

FIG. 8 is a table illustrating a relationship among a type of job, a measured body height, and a discharge tray to be selected.

The following describes a discharge tray determined as a discharge destination of sheets based on a type of job executed by the image forming apparatus 10 and a determination result of a measured body height (for example, the determination result of whether the body height is 120 cm or more).

In a case where the personal print job is executed, a printed product is discharged to the discharge tray designated by a printer driver installed in a client terminal which transmits the personal print job, irrespective of a measured body height of a user. The designation types that are designated through the printer driver include an upper discharge tray designation, a lower discharge tray designation, and an automatic discharge tray designation. In a case where the personal print job is executed and the upper discharge tray designation or the lower discharge tray designation is set, the printed product is discharged to the selected discharge tray. On the other hand, in a case where the automatic discharge tray designation is set through the printer driver, and if the measured body height is 120 cm or more, the predetermined discharge tray is selected as a discharge destination of the printed product and the printed product is thus discharged to the predetermined discharge tray. Furthermore, in a case where the automatic discharge tray designation is set through the printer driver, and if the measured body height is less than 120 cm, the lower discharge tray 12 is selected as a discharge destination of the printed product and the printed product is thus discharged to the lower discharge tray 12.

In a case where the facsimile memory output job is executed, and if the measured body height is 120 cm or more, the printed product is discharged to the predetermined discharge tray. However, if the measured body height is less than 120 cm, the printed product is discharged to the lower discharge tray 12.

In a case where the copy job is executed, and if the measured body height is 120 cm or more, the printed product is discharged to the predetermined discharge tray. If the measured body height is less than 120 cm, the printed product is discharged to the lower discharge tray 12.

Figure 9:
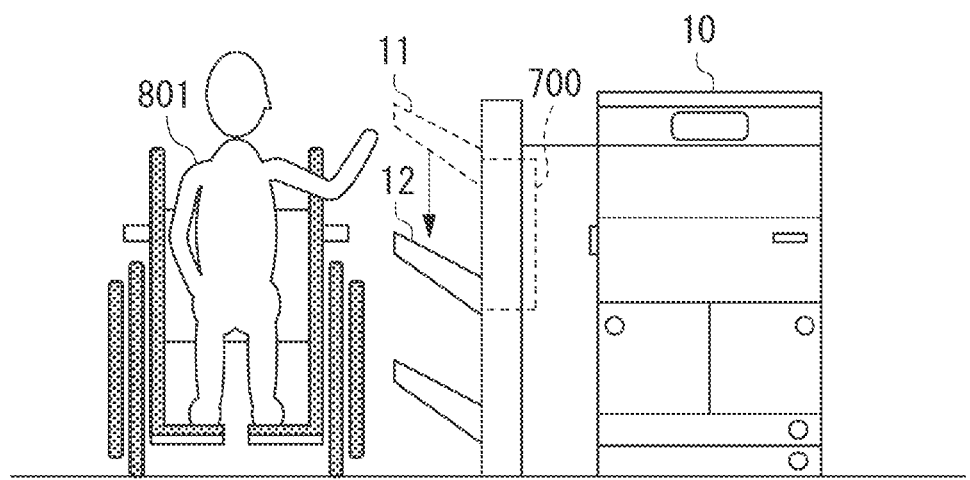
FIG. 9 is an external view of an image forming apparatus according to other exemplary embodiments.

According to the first exemplary embodiment, in a case where a user is determined as the wheelchair user (user whose boy height is less than 120 cm, for example), a discharge tray convenient for the wheelchair user is automatically selected. The present invention is not limited to the above exemplary embodiment. In a case where the image forming apparatus 10 includes a moving mechanism (elevating mechanism) for moving a discharge tray upward and downward, the discharge tray may be moved upward and downward according to the measured body height. More specifically, according to a second exemplary embodiment, as illustrated in FIG. 9, if the body height of the user who executes a job using the operation unit 500 is less than 120 cm, for example, the controller unit 200 controls a moving mechanism 700 to move downward the discharge tray 11 or 12 (to a first position). Furthermore, if the body height of the user who executes the job using the operation unit 500 is 120 cm or more, the controller unit 200 controls the moving mechanism 700 to move upward the discharge tray 11 or 12 (to a second position above the first position). The image formed sheets are discharged to a predetermined discharge tray.

According to the present exemplary embodiment, the moving mechanism 700 moves the discharge tray 11 or 12 upward and downward. The second exemplary embodiment is not limited to the above example. In a case where the discharge tray 11 or 12 is moved according to the body height, the discharge tray 11 or 12 may be moved to one direction. In other words, in a case where a home position is set to the discharge tray 11, the discharge tray 11 may be moved from the home position to only one direction, which is upward or downward, according to the body height of the user who accesses the image forming apparatus 10.

In a case where the image forming apparatus 10 includes the above-described moving mechanism 700 for moving the discharge tray, a single discharge tray may be provided to the image forming apparatus 10

In a case where the image forming apparatus 10 includes a plurality of discharge trays and the moving mechanism 700 for moving the discharge trays, sheets may be discharged to a discharge tray which is closer to a target position, and then the discharge tray on which the sheets are stacked may be moved to the target position.

According to the first exemplary embodiment, sheets are discharged to the lower discharge tray 12, if the user who issues an instruction for printing is short (less than 120 cm, for example). However, sheets may be discharged not only to the lower discharge tray 12 for a short user, but also to the upper discharge tray 11 for a tall user (180 cm or more, for example).

According to the first exemplary embodiment, the image forming apparatus 10 includes the two discharge trays 11 and 12. Alternatively, three or more discharge trays may be included.

According to the first exemplary embodiment, the infrared array sensor 601 is used. However, the present invention is not limited to the above example. More specifically, a camera may be used instead of the infrared array sensor 601.

The functions illustrated in the flow chart according to the present exemplary embodiment can be realized also by processing apparatuses (CPU or processor), such as a personal computer executing the software (program) acquired via a network or various storage media.

With the image forming apparatus according to the present invention, sheets can be discharged to a stacking unit suitable for the body height of a user by dynamically changing the stacking unit to the one which is suitable for the body height of the user.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269668 filed Dec. 26, 2013, which is hereby incorporated by reference herein in its entirety.

What is claimed is:
1. An image forming apparatus comprising:
an image forming unit configured to form an image on a sheet as a printed sheet;
a plurality of stacking units on which to stack the printed sheet;
a reception unit configured to receive an instruction from a user to cause the image forming unit to form the image on the sheet;
a determination unit configured to determine whether a body height of the user is equal to or greater than a predetermined value, wherein the body height of the user is a height of the user as (i) measured by an electronic device in response to an operation on the image forming apparatus to start printing and (ii) received by the determination unit;
a decision unit configured to decide, from among the plurality of stacking units and based on the determination by the determination unit, a stacking unit on which to stack the printed sheet; and a control unit configured to perform control to discharge the printed sheet to the stacking unit decided by the decision unit.

2. The image forming apparatus according to claim 1, wherein, in a case where the determination unit determines that the body height of the user is equal to or greater than the predetermined value, the decision unit decides a predetermined stacking unit as the stacking unit to stack the printed sheet and, wherein, in a case where the determination unit determines that the body height of the user is less than the predetermined value, the decision unit decides a stacking unit, which is lower than the predetermined stacking unit, as the stacking unit to stack the printed sheet.

3. The image forming apparatus according to claim 1, wherein, based on the determination by the determination unit and a type of job executed according to the instruction, the decision unit decides the stacking unit on which to stack the printed sheet from among the plurality of stacking units.

4. The image forming apparatus according to claim 3, wherein, in a case where, according to an instruction of a user who logs in the image forming apparatus, a personal print job to cause the image forming unit to form an image using image data which has been previously transmitted by the user is executed, and if a stacking unit on which to discharge a printed sheet is not designated in the personal print job, the decision unit decides the stacking unit on which to stack the printed sheet from among the plurality of stacking units based on the determination by the determination unit.

5. The image forming apparatus according to claim 3, further comprising a reading unit configured to read an image on a document, wherein, in a case where a copy job to cause the reading unit to read the image on the document and to cause the image forming unit to form the image using image data corresponding to the image on the document read by the reading unit is executed, the decision unit decides the stacking unit on which to stack the printed sheet from among the plurality of stacking units based on the determination by the determination unit.

6. The image forming apparatus according to claim 3, wherein, in a case where a facsimile memory output job to cause the image forming unit to form an image using stored facsimile data, the decision unit decides the stacking unit on which to stack the printed sheet from among the plurality of stacking units based on the determination by the determination unit.

7. The image forming apparatus according to claim 1, further comprising the electronic device, wherein the electronic device is a detection unit configured to detect a body height of a person who accesses the image forming apparatus, wherein the determination unit determines whether the body height of the user is equal to or greater than the predetermined value based on a state detected by the detection unit.

8. The image forming apparatus according to claim 7, wherein the detection unit is an infrared array sensor including a plurality of receiving units configured to receive infrared rays.

9. The image forming apparatus according to claim 7, wherein the detection unit is fixed and directed obliquely upward to face a person's face skin.

10. The image forming apparatus according to claim 1, wherein the operation on the image forming apparatus for starting printing is the reception unit receiving the image forming instruction from the user.

11. A method for controlling an image forming apparatus, wherein the image forming apparatus includes an image forming unit configured to form an image on a sheet as a printed sheet and a plurality of stacking units on which to stack the printed sheet, the method comprising:

receiving, via a reception unit, an instruction from a user to cause the image forming unit to form the image on the sheet;

determining, via a determination unit, whether a body height of the user is equal to or greater than a predetermined value, wherein the body height of the user is a height of the user as (i) measured by an electronic device in response to an operation on the image forming apparatus to start printing and (ii) received by the determination unit;

deciding, via a decision unit from among the plurality of stacking units and based on the determination by the determination unit, a stacking unit on which to stack the printed sheet; and performing control, via a control unit, to discharge the printed sheet to the stacking unit decided by the decision unit.

12. A non-transitory recording medium storing a program to cause a computer to perform a method for controlling an image forming apparatus, wherein the image forming apparatus includes an image forming unit configured to form an image on a sheet as a printed sheet and a plurality of stacking units on which to stack the printed sheet, the method comprising:

receiving, via a reception unit, an instruction from a user to cause the image forming unit to form the image on the sheet;

determining, via a determination unit, whether a body height of the user is equal to or greater than a predetermined value, wherein the body height of the user is a height of the user as (i) measured by an electronic device in response to an operation on the image forming apparatus to start printing and (ii) received by the determination unit;

deciding, via a decision unit from among the plurality of stacking units and based on the determination by the determination unit, a stacking unit on which to stack the printed sheet; and performing control, via a control unit, to discharge the printed sheet to the stacking unit decided by the decision unit.

13. An image forming apparatus comprising:

an image forming unit configured to form an image on a sheet as a printed sheet;

a stacking unit on which to stack the printed sheet;

a reception unit configured to receive an instruction from a user to cause the image forming unit to form the image on the sheet;

a determination unit configured to determine whether a body height of the user is equal to or greater than a predetermined value, wherein the body height of the user is a height of the user as (i) measured by an electronic device in response to the reception unit receiving the image forming instruction from the user and (ii) received by the determination unit; and a moving unit configured to move the stacking unit to receive the printed sheet based on the determination by the determination unit.

14. The image forming apparatus according to claim 13, wherein the stacking unit is a first stacking unit, the image forming apparatus further comprising:

a plurality of stacking units on which to stack the printed sheet, wherein the plurality of stacking units includes the first stacking unit; and a control unit configured to perform control to discharge the printed sheet to a stacking unit that is predetermined from among the plurality of the stacking units, wherein the moving unit moves the predetermined stacking unit to receive the printed sheet based on the determination by the determination unit.

15. The image forming apparatus according to claim 14, wherein, in a case where, according to an instruction of a user who logs in the image forming apparatus, a personal print job to cause the image forming unit to form an image using image data which has been previously transmitted by the user is executed, and if a stacking unit on which to discharge a printed sheet is not designated in the personal print job, the decision unit decides the stacking unit on which to stack the printed sheet from among the plurality of stacking units based on the determination by the determination unit.

16. The image forming apparatus according to claim 14, further comprising a reading unit configured to read an image on a document, wherein, in a case where a copy job to cause the reading unit to read the image on the document and to cause the image forming unit to form the image using image data corresponding to the image on the document read by the reading unit is executed, the decision unit decides the stacking unit on which to stack the printed sheet from among the plurality of stacking units based on the determination by the determination unit.

17. The image forming apparatus according to claim 14, wherein, in a case where a facsimile memory output job to cause the image forming unit to form an image using stored facsimile data, the decision unit decides the stacking unit on which to stack the printed sheet from among the plurality of stacking units based on the determination by the determination unit.

18. The image forming apparatus according to claim 13, further comprising the electronic device, wherein the electronic device is a detection unit configured to detect a body height of a person who accesses the image forming apparatus, wherein the determination unit determines whether the body height of the user is equal to or greater than the predetermined value based on a state detected by the detection unit.

19. The image forming apparatus according to claim 18, wherein the detection unit is an infrared array sensor including a plurality of receiving units configured to receive infrared rays.

20. A method for controlling an image forming apparatus, wherein the image forming apparatus includes an image forming unit configured to form an image on a sheet as a printed sheet and a stacking unit on which to stack the printed sheet, the method comprising:

receiving, via a reception unit, an instruction from a user to cause the image forming unit to form the image on the sheet;

determining, via a determination unit, whether a body height of the user is equal to or greater than a predetermined value, wherein the body height of the user is a height of the user as (i) measured by an electronic device in response to the reception unit receiving the image forming instruction from the user and (ii) received by the determination unit; and moving, via a moving unit, the stacking unit to receive the printed sheet based on the determination by the determination unit.

21. A non-transitory recording medium storing a program to cause a computer to perform a method for controlling an image forming apparatus, wherein the image forming apparatus includes an image forming unit configured to form an image on a sheet as a printed sheet and a stacking unit on which to stack the printed sheet, the method comprising:

receiving, via a reception unit, an instruction from a user to cause the image forming unit to form the image on the sheet;

determining, via a determination unit, whether a body height of the user is equal to or greater than a predetermined value, wherein the body height of the user is a height of the user as (i) measured by an electronic device in response to the reception unit receiving the image forming instruction from the user and (ii) received by the determination unit; and moving, via a moving unit, the stacking unit to receive the printed sheet based on the determination by the determination unit.

* * * * *